(12) United States Patent
Kopecky et al.

(10) Patent No.: US 10,442,337 B2
(45) Date of Patent: Oct. 15, 2019

(54) VEHICLE HEADLIGHT WITH SEPARABLE PIVOTING LEVER

(71) Applicants: Hella KGaA Hueck & Co., Lippstadt (DE); HELLA AUTOTECHNIK NOVA s.r.o., Mohelnice (CZ)

(72) Inventors: Roman Kopecky, Lostice (CZ); Jan Formanek, Mohelnice (CZ); Jaroslaw Schimon, Bielefeld (DE); Domingo Guerrero, Soest (DE); Thomas Hilsenbeck, Erwitte (DE)

(73) Assignees: Hella KGaA Hueck & Co., Lippstadt (DE); HELLA AUTOTECHNIK NOVA s.r.o., Mohelnice (CZ)

( * ) Notice: Subject to any disclaimer, the term of this patent is extended or adjusted under 35 U.S.C. 154(b) by 0 days.

(21) Appl. No.: 15/556,009

(22) PCT Filed: Mar. 2, 2016

(86) PCT No.: PCT/DE2016/100092
§ 371 (c)(1),
(2) Date: Sep. 6, 2017

(87) PCT Pub. No.: WO2016/141924
PCT Pub. Date: Sep. 15, 2016

(65) Prior Publication Data
US 2018/0056849 A1    Mar. 1, 2018

(30) Foreign Application Priority Data

Mar. 12, 2015 (DE) .......................... 10 2015 103 623

(51) Int. Cl.
*B60Q 1/00* (2006.01)
*B60Q 1/068* (2006.01)
(Continued)

(52) U.S. Cl.
CPC ......... *B60Q 1/0064* (2013.01); *B60Q 1/0683* (2013.01); *B60Q 1/076* (2013.01); *B60Q 1/10* (2013.01); *B60Q 2200/36* (2013.01)

(58) Field of Classification Search
CPC ...... B60Q 1/068; B60Q 1/0683; B60Q 1/076; B60Q 1/10; B60Q 1/115; B60Q 1/0064; B60Q 2200/36; B60Q 2200/32
See application file for complete search history.

(56) References Cited

U.S. PATENT DOCUMENTS

2003/0117812 A1    6/2003  Hong et al.
2005/0088852 A1*   4/2005  Aguinaga ............. B60Q 1/068
                                                            362/524
(Continued)

FOREIGN PATENT DOCUMENTS

EP    0889281 A1     1/1999
EP    2213513 A1 *  8/2010  ........... B60Q 1/0683
(Continued)

OTHER PUBLICATIONS

International Search Report dated Jun. 27, 2016, in International Application No. PCT/DE2016/100092.

*Primary Examiner* — Anh T Mai
*Assistant Examiner* — Michael Chiang
(74) *Attorney, Agent, or Firm* — Patent Central LLC; Stephan A. Pendorf

(57) ABSTRACT

A headlight for vehicles, in particular trucks, comprising a lighting unit which is pivotably mounted about a pivot axis; a linear drive unit which contains a linearly movable actuator; and a pivoting lever which is coupled to a lighting unit at a first end and to the actuator at a second end, wherein the lighting unit is pivotable by means of the actuator. The pivoting lever is designed in multiple parts, comprising a lower pivoting lever element having a support part for supporting on the actuator and an upper pivoting lever (Continued)

Figure 1:
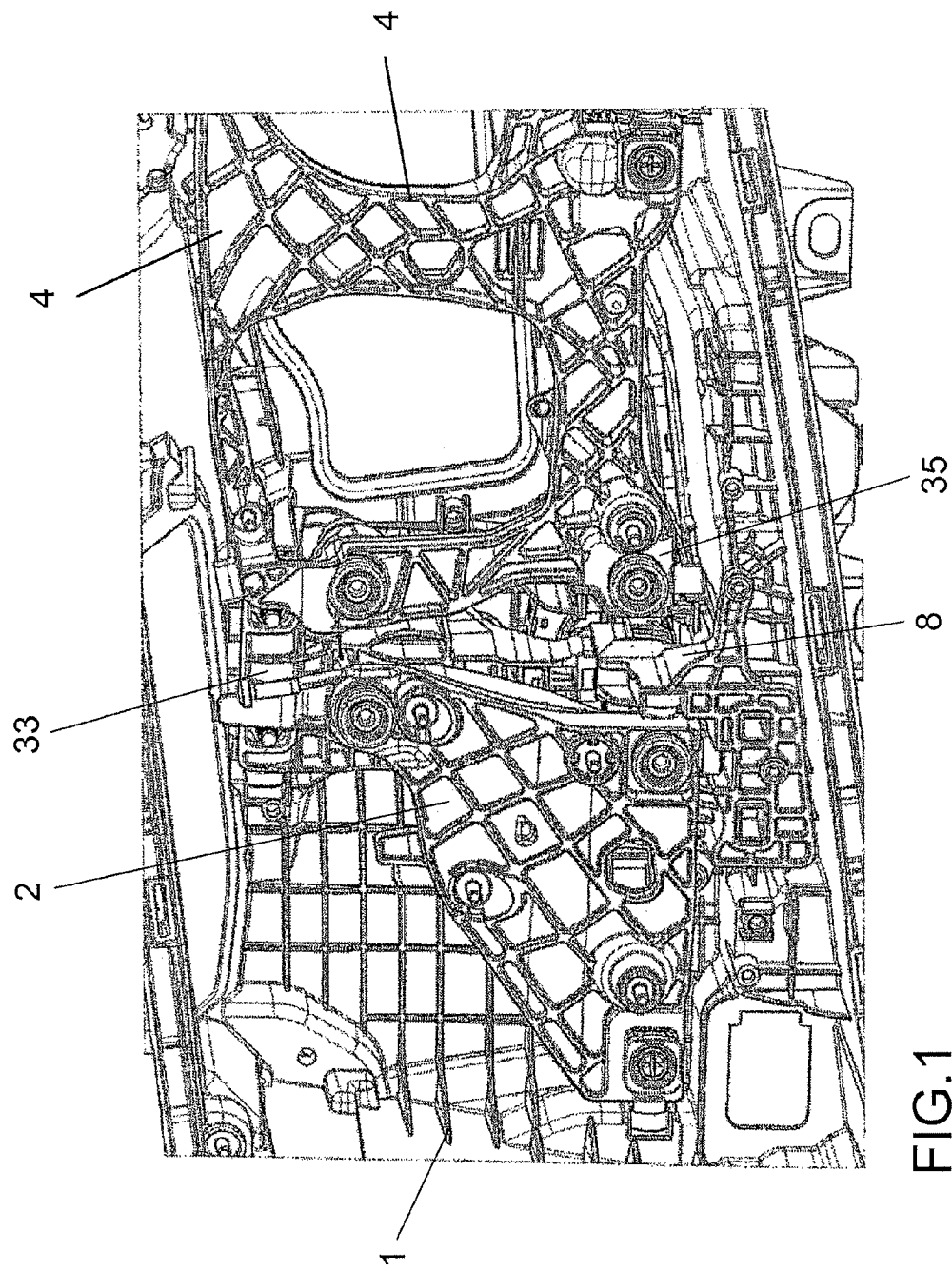

element on which a horizontal axis is arranged, the pivoting lever being pivotably mounted about said axis.

12 Claims, 5 Drawing Sheets

(51) Int. Cl.
  *B60Q 1/076* (2006.01)
  *B60Q 1/10* (2006.01)

(56) References Cited

U.S. PATENT DOCUMENTS

2014/0340915 A1* 11/2014 Tajima ................ B60Q 1/0683
  362/460
2016/0201869 A1*  7/2016 Shibata ............... B60Q 1/0683
  362/512

FOREIGN PATENT DOCUMENTS

| EP | 2719579 | A2 | 4/2014 |
| EP | 2682304 | A1 | 8/2014 |
| EP | 2803529 | A2 | 11/2014 |

* cited by examiner

VEHICLE HEADLIGHT WITH SEPARABLE PIVOTING LEVER

The invention relates to a headlight for vehicles, in particular trucks, comprising a lighting unit which is pivotably mounted about a pivot axis; a linear drive unit which contains a linearly movable actuator; and a pivoting lever which is coupled to a lighting unit at a first end and to the actuator at a second end, wherein the lighting unit can be brought into a pivot position by means of the actuator.

A headlight for vehicles, in which a lighting unit is pivotably mounted about a horizontal and a vertical pivot axis, is known from EP 2 682 304 A1. In order to pivot the lighting unit about the vertical pivot axis, a linear drive unit having a linearly movable actuator acts on a pivoting lever, by means of which the lighting unit is pivoted. For this purpose, one end of the pivoting lever engages in a sliding track which is connected to a supporting frame of the lighting unit. The pivoting lever is mounted by means of opposite shaft journals in a slot of a housing. Since the linear drive unit is provided to pivot the lighting unit about a vertical pivot axis, there is no need for high actuating forces.

If the lighting unit is to be pivoted about a horizontal axis, wherein the lighting unit is in particular a headlight for trucks, relatively high actuating forces are sometimes required. The problem in this case is making these actuating forces available in an area having limited space.

It is the object of the present invention to further develop a headlight for vehicles such that high actuating forces for pivoting a lighting unit can be introduced in a space-saving manner, ensuring in particular that a linear drive unit can be replaced quickly and simply.

In order to achieve this object, the connection in conjunction with the preamble of claim 1 is characterized in that the pivoting lever is designed in multiple parts, comprising a lower pivoting lever element containing a support part for supporting on the actuator and an upper pivoting lever element on which a horizontal axis is arranged, the pivoting lever being pivotably mounted about said axis.

The particular advantage of the invention is that, due to the multiple-part design of the pivoting lever, one component of a linear drive unit or the entire linear drive unit can be simply dismantled or reassembled, for example for repair purposes. After detaching a lower pivoting lever element of the pivoting lever from an upper pivoting lever element thereof, on the one hand, and successfully detaching the linear drive unit from a housing of the headlight, on the other hand, the linear drive unit can be removed together with the lower pivoting lever element from an opening of the headlight housing.

According to a preferred embodiment of the invention, the lower pivoting lever element is connected non-positively to the upper pivoting lever element, in particular by a screw connection. The linear drive unit is also preferably connected by means of a screw connection to the headlight housing so that the lower pivoting lever element can be detached from the upper pivoting lever element and the linear drive unit can be detached from the housing by means of a single tool. The linear drive unit can then be removed horizontally together with the lower pivoting lever element in a dismantling direction which extends vertically to the horizontal pivot axis.

According to a preferred embodiment of the invention, the upper pivoting lever element and the lower pivoting lever element each have a sliding element on a facing side so that the two elements are arranged so that they can be moved relative to one another in a dismantling direction or opposing assembly direction. The linear drive unit together with the lower pivoting lever element can therefore be advantageously removed, guided in the dismantling direction, after detaching the screw connection, wherein the upper pivoting lever element remains in its assembly position.

According to a further development of the invention, the pivoting lever is arranged in an opening of the headlight housing in a space-saving manner such that at least one motor of the linear drive unit, projecting onto an extension plane of the pivoting lever, partially covers said pivoting lever. This guarantees a space-saving arrangement of the adjusting device thus formed from the linear drive and pivoting lever.

According to a further development of the invention, the pivoting lever at the lower end has a support part which is mounted on a linearly movable actuator of the linear drive unit in the manner of a clamp. The pivoting lever can be pivoted about the horizontal pivot axis by moving the actuator, wherein the relatively long lever arm is used to initiate relatively high actuating forces.

According to a further development of the invention, the pivoting lever is configured from a plastic material with reinforcing ribs arranged in a distributed manner so that it has relatively high stiffening.

Further advantages of the invention are set out in the additional subordinate claims.

Figure 2:
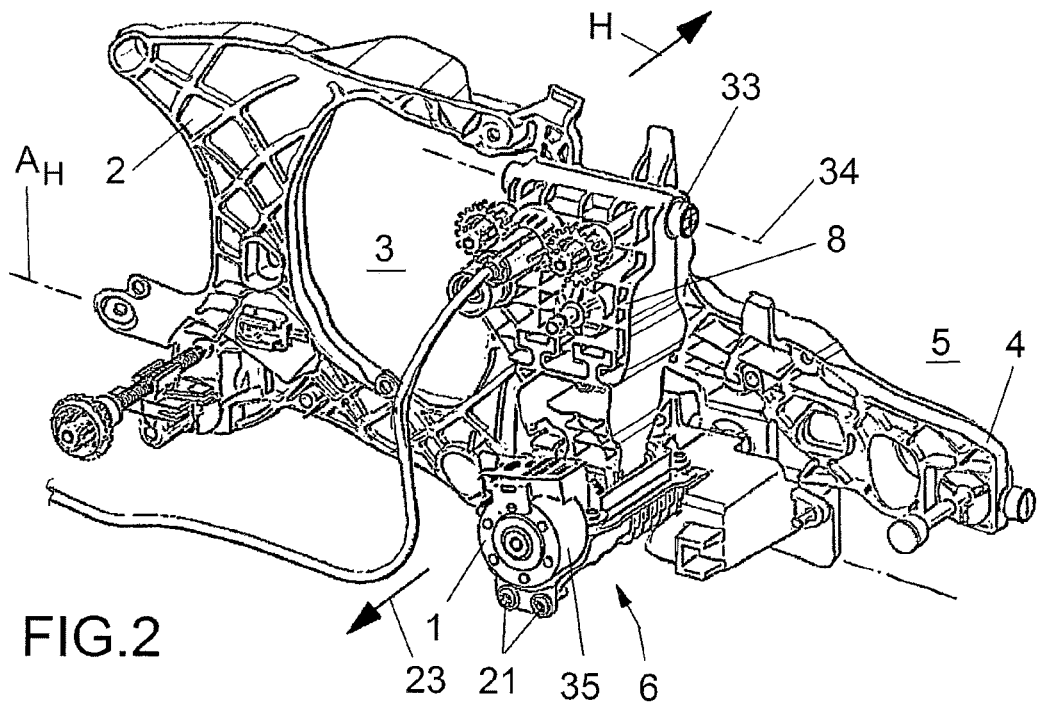
Figure 3:
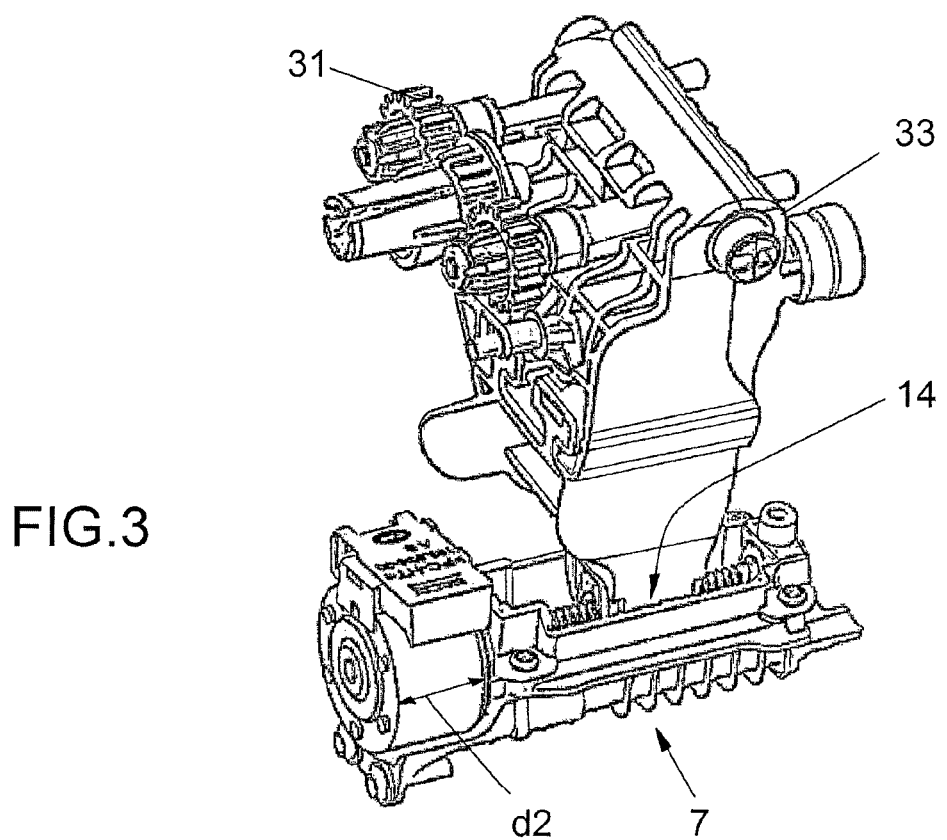
Figure 4:
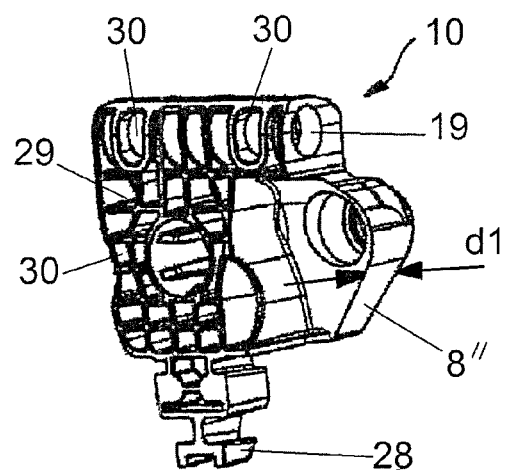
Figure 5:
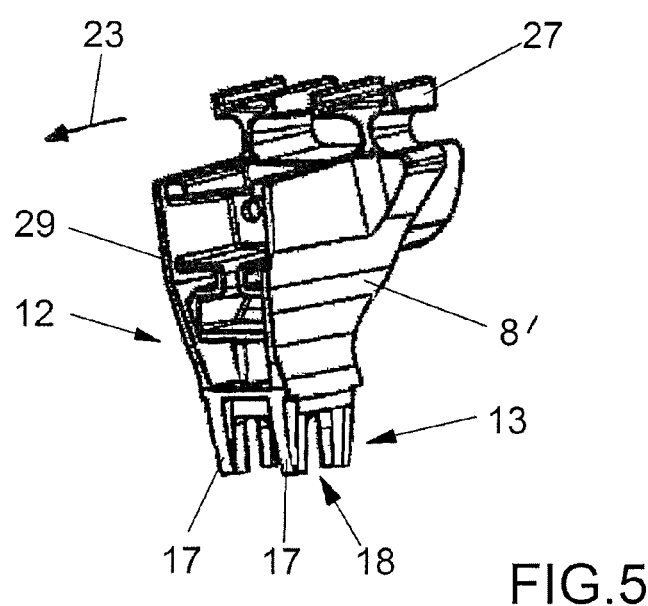
Figure 6:
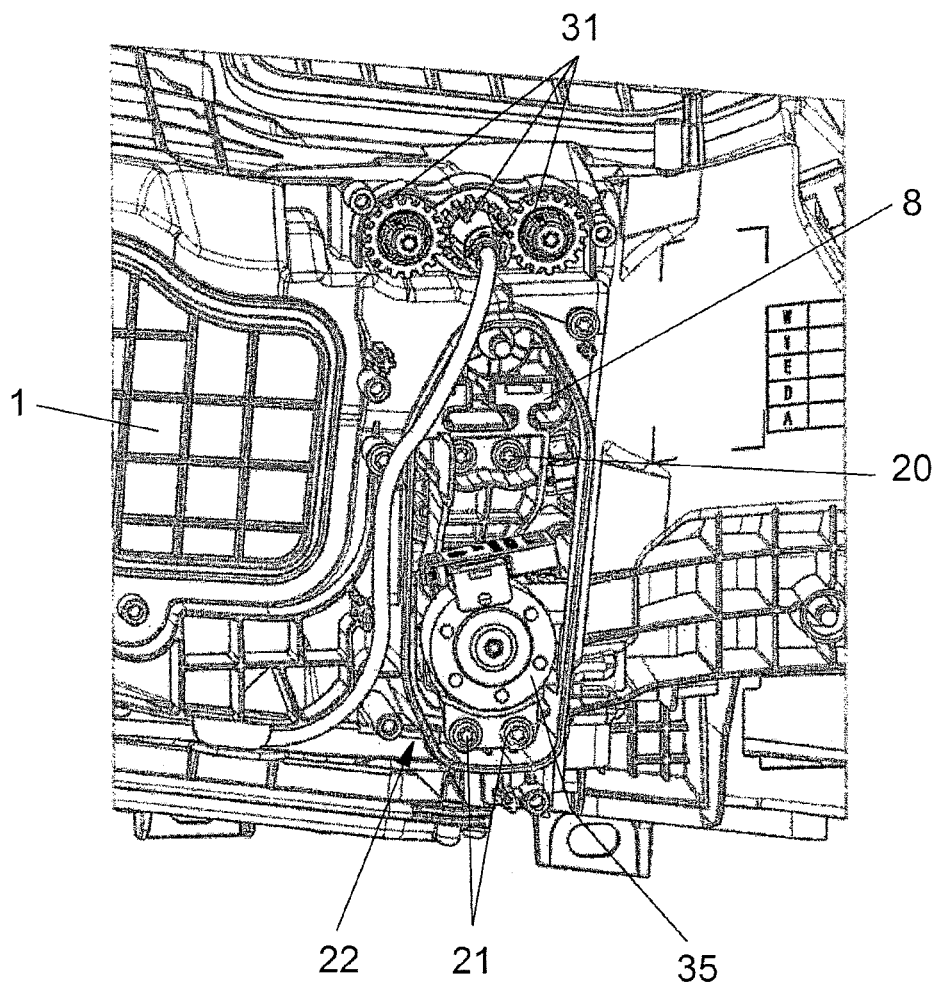
Figure 7:
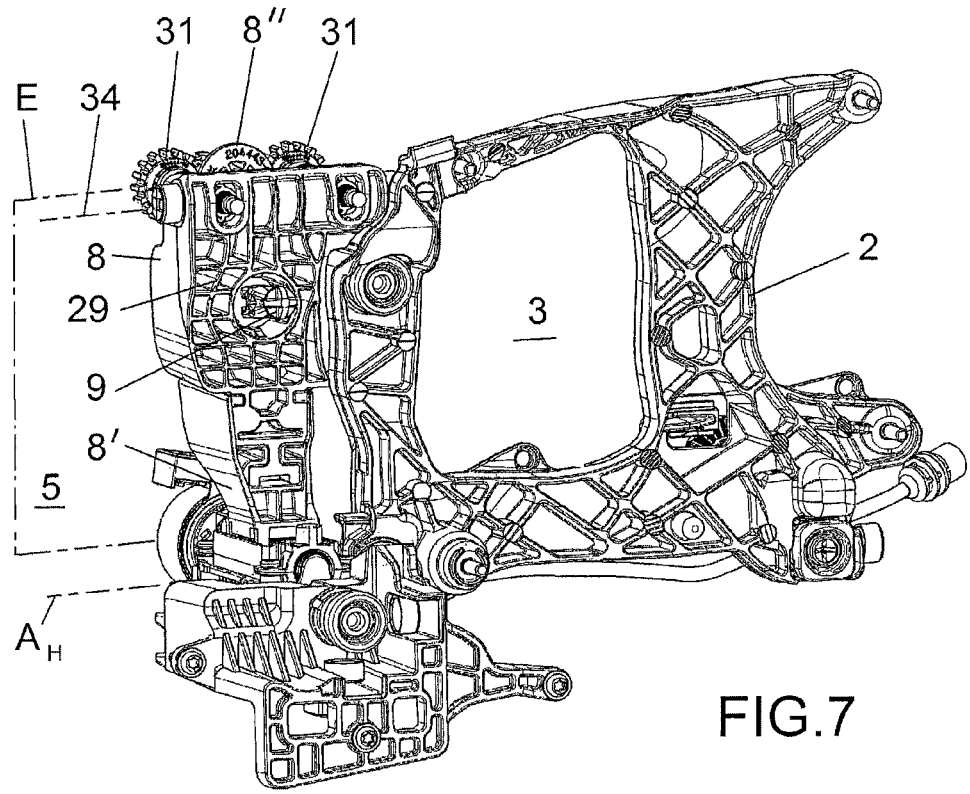
Figure 8:
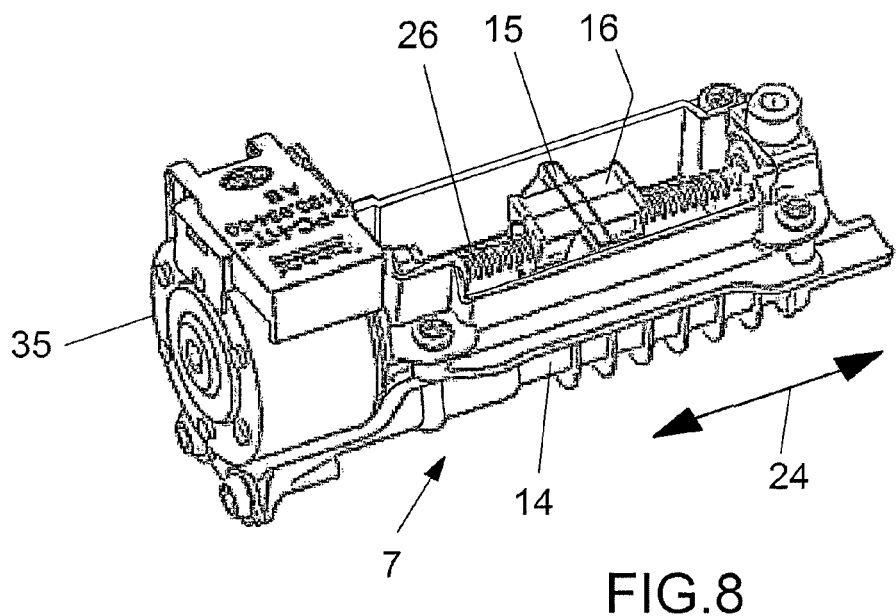

One embodiment example of the invention will be explained in greater detail below with reference to the drawings:

FIG. 1 shows a rear view of a headlight having a housing and an adjusting device for adjusting a lighting unit that is arranged in a supporting frame (lighting unit not shown), FIG. 2 shows a rear view of the headlight without a housing, but having a supporting frame for the lighting units, FIG. 3 shows a perspective rear view of a linear drive unit and a pivoting lever of the adjusting device, which is attached to said linear drive unit, FIG. 4 shows a rear view of an upper pivoting lever element of the pivoting lever, FIG. 5 shows a perspective rear view of a lower pivoting lever element of the pivoting lever, FIG. 6 shows a rear view of the headlight having a housing in the region of the adjusting device, FIG. 7 shows a front view of the adjusting device and a first supporting frame, and FIG. 8 shows a perspective representation of the linear drive unit.

A headlight for vehicles is preferably envisaged as a headlight for trucks. The headlight has a housing 1, to which a first supporting frame 2 for receiving a first lighting unit 3 and a second supporting frame 4 for receiving a second lighting unit 5 are fixed. The first lighting unit 3 and the second lighting unit 5 can each have a reflector and a light source, wherein the first lighting unit 3 can be used to generate a low-beam distribution and the second lighting unit 5 can be used to generate a high-beam distribution. The reflectors of the first lighting unit 3 and the second lighting unit 5 are each fixedly connected to the first supporting frame 2 or second supporting frame 4.

In order to adjust the lighting range of the first lighting unit 3 and the second lighting unit 5 an adjusting device 6 is provided, by means of which the lighting units 3, 5 are pivotably arranged about a horizontal axis $A_H$. The adjusting device 6 comprises a linear drive unit 7 as well as a pivoting lever 8 coupled to the linear drive unit 7, which pivoting lever acts by means of an engagement element 9 on the second supporting frame 4 in the sense of a pivoting of the same about the horizontal axis $A_H$.

The horizontal axis $A_H$ is located in a lower region of the headlight or in a lower region of the supporting frames 2 and 4 respectively.

At an upper end 10 of the pivoting lever 8, said pivoting lever has a transverse bore in which a cylindrical pivoting lever axis 33 is rotatably mounted to the pivoting lever. Ends of the pivoting lever axis 33 are rotatably mounted in receptacles of the housing 1. If necessary, the pivoting lever axis 33 can also be fixedly connected to the pivoting lever 8. One axis 34 of the pivoting lever axis 33 serves as a pivot axis, about which the pivoting lever 8 is pivoted in the adjusting mode. The pivoting lever axis 33 or the axis 34 extends in the horizontal direction and perpendicular to a main radiation direction H of the headlight.

The engagement element 9 of the pivoting lever 8 is configured as a plunger projecting from the front side of the pivoting lever 8, which plunger is pivotably mounted in a cavity of the second supporting frame 4. The plunger 9 pushes against the second supporting frame 4 and prevents the second supporting frame 4 from pivoting backwards.

A second end 12 of the pivoting lever 8, which is arranged at the bottom in the vertical direction, has a support part 13 for supporting on an actuator 14 which is arranged so that it can be linearly moved by means of the linear drive unit 7. The support part 13 is configured in the manner of a clamp and only rests on an upper side 16 of the actuator 14, said upper side being provided with an elevated crossbar 15. The crossbar 15 extends in the assembly position of the pivoting lever 8 in a groove 18 formed by two fork parts 17 of the support part 13. By raising the pivoting lever 8, said pivoting lever can be removed from the actuator 14.

According to an alternative embodiment of the invention, which is not shown, the lower end 12 of the pivoting lever 8 can also be connected by means of locking with the actuator 14.

The pivoting lever 8 is designed in multiple parts. In the present embodiment example, the pivoting lever 8 consists of a lower pivoting lever element 8' and an upper pivoting lever element 8". The lower pivoting lever element 8' has the support part 13. The upper pivoting lever element 8" has at its upper end 10 a bore 19 for receiving the pivoting lever axis 33.

The lower pivoting lever element 8' and the upper pivoting lever element 8" are detachably connected to one another. In the present embodiment example, the two pivoting lever elements 8', 8" are connected non-positively to one another, namely by a screw connection 20, see FIG. 6. The linear drive unit 7 is connected by another screw connection 21 to the housing 1 of the headlight.

Both the linear drive unit 7 and the pivoting lever 8 are arranged in an opening 22 of the housing 1. If the linear drive unit 7 is to be dismantled from the headlight fitted to the vehicle for repair purposes, the screw connection 20 of the pivoting lever 8 as well as the screw connection 21 of the linear drive unit 7 are detached in a first step, so that the linear drive unit 7 can be dismantled together with the lower pivoting lever element 8' along a dismantling direction 23 from the opening 22 of the housing 1. The dismantling direction 23 extends in a horizontal direction perpendicular to the horizontal pivot axis $A_H$. The dismantling direction 23 extends in the direction of an actuating path 24 of the actuator 14 which is in threaded engagement with a threaded rod 26 driven by a motor 35 of the linear drive unit 7. The threaded rod 26 extends in the direction of the actuating path 24.

The removal of the lower pivoting lever element 8' from the upper pivoting lever element 8" is favored by sliding elements 27 and 28 arranged on sides which face each other of the lower pivoting lever element 8' and the upper pivoting lever element 8". The sliding element 27 of the lower pivoting lever element 8' is designed as a rail. The sliding element 28 of the upper pivoting lever element 8" is designed as a sledge which is mounted on the rail 27 of the lower pivoting lever element 8'. The rail 27 and the sledge 28 facilitate a relative movement of the lower pivoting lever element 8' to the upper pivoting lever element 8" in the dismantling direction 23 or in the horizontal direction perpendicular to the horizontal pivot axis $A_H$. In this way, a guided removal of the lower pivoting lever element 8' from the upper pivoting lever element 8" together with the linear drive unit 7 is guaranteed during dismantling.

Following dismantling, the lower pivoting lever element 8' can be removed from the actuator 14 of the linear drive unit 7. After exchanging the linear drive unit 7 or the motor 35, these can be reassembled together with the lower pivoting lever element 8', wherein the assembly takes place in the reverse order to the dismantling.

FIG. 6 shows that the motor 35 of the linear drive unit 7, projecting onto an extension plane E of the pivoting lever 8, partially covers the lower pivoting lever element 8'. The adjusting device 6 is therefore mounted in the opening 22 of the housing 1 in a relatively space-saving manner.

The pivoting lever 8 or the lower pivoting lever element 8' and the upper pivoting lever element 8" are produced from a plastic material with reinforcing ribs 29 arranged in a distributed manner. The pivoting lever 8 is designed as a solid body having multiple bores 30, said body having a thickness d1 at least in certain regions, which thickness corresponds in the region to a thickness d2 of the motor 25. The bores 30 provide engaging through means 31 for adjusting the pivoting lever 8 about a further horizontal pivot axis which extends through the actuator 14.

According to an alternative embodiment of the invention, which is not shown, the pivoting lever 8 can also consist of three or more parts.

According to an alternative embodiment of the invention, which is not shown, the headlight can also have only one supporting frame with a lighting unit.

According to an alternative embodiment of the invention, which is not shown, the headlight can also have multiple supporting frames with respective lighting units which are coupled to one another so that they can be pivoted synchronously.

The invention claimed is:

1. A headlight for vehicles, comprising
    a lighting unit (5) fixedly connected to a supporting frame (4) which is pivotably mounted about a pivot axis ($A_H$);
    a linear drive unit (7) which contains a linearly movable actuator (14); and
    a pivoting lever (8) which is coupled to the lighting unit (5) at a first end (10) and to the actuator (14) at a second end (12),
    wherein the lighting unit (5) is pivotable by means of the actuator, wherein the pivoting lever (8) is designed in multiple parts, comprising a lower pivoting lever element (8') having a support part (13) for supporting on the actuator (14) and an upper pivoting lever element (8") on which a horizontal axis (34) is arranged, the pivoting lever (8) being pivotably mounted about said axis, and wherein the pivoting lever (8) acts by means of an engagement element (9) on the supporting frame (4) for pivoting the supporting frame (4) about the horizontal axis ($A_H$).

2. The headlight according to claim 1, wherein the lower pivoting lever element (8') and the upper pivoting lever element (8") are detachably connected to one another.

3. The headlight according to claim 1, wherein the lower pivoting lever element (8') and the upper pivoting lever element (8") are connected non-positively to one another.

4. The headlight according to claim 1, wherein the upper pivoting lever element (8") and the lower pivoting lever element (8') each have a sliding element (27, 28) on a facing side, which sliding elements are arranged relatively movable with respect to one another in a dismantling direction (23) which extends vertically to the horizontal pivot axis ($A_H$).

5. The headlight according to claim 1, wherein the headlight is provided with a housing (1), the pivoting lever (8) is mounted in an opening (22) of the housing (1) of the headlight, and wherein a motor (35) of the linear drive unit (7), projecting onto an extension plane (E) of the pivoting lever (8), partially covers the lower pivoting lever element (8').

6. The headlight according to claim 5, wherein the linear drive unit (7) is connected non-positively to the housing (1) of the headlight.

7. The headlight according to claim 1, wherein the linear drive unit (7) is provided with a motor (35), wherein the motor (35) of the linear drive unit (7) is controlled by a control signal for adjusting the lighting range, and wherein the pivoting lever (8) is pivotable about the horizontal axis (34) arranged at the upper end (10) of the upper pivoting lever element (8").

8. The headlight according to claim 1, wherein the support part (13) of the lower pivoting lever element (8') rests on the actuator (14) in the manner of a clamp or a claw.

9. The headlight according to claim 1, wherein the upper pivoting lever element (8") has bores (30) for engaging through means (31) for adjusting the pivoting lever (8) about a further horizontal pivot axis which extends through the actuator (14).

10. The headlight according to claim 1, wherein the pivoting lever (8) is plastic with reinforcing ribs arranged in a distributed manner (29).

11. The headlight according to claim 1, wherein the vehicles are trucks.

12. The headlight according to claim 1, wherein the lower pivoting lever element (8') and the upper pivoting lever element (8") are connected by a screw connection.

\* \* \* \* \*